United States Patent
Birk et al.

(10) Patent No.: US 7,551,816 B1
(45) Date of Patent: Jun. 23, 2009

(54) ARRANGEMENT FOR LOW COST PATH PROTECTION FOR OPTICAL COMMUNICATIONS NETWORKS

(75) Inventors: Martin Birk, Belford, NJ (US); Angela Lan Chiu, Holmdel, NJ (US); John L. Strand, Holmdel, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 12/152,564

(22) Filed: May 15, 2008

Related U.S. Application Data

(63) Continuation of application No. 11/799,007, filed on Apr. 30, 2007, now Pat. No. 7,389,018, which is a continuation of application No. 11/513,970, filed on Aug. 31, 2006, now Pat. No. 7,228,027, which is a continuation of application No. 11/051,377, filed on Feb. 4, 2005, now Pat. No. 7,171,070.

(51) Int. Cl.
*G02B 6/26* (2006.01)
*H04B 10/08* (2006.01)

(52) U.S. Cl. ............................ 385/24; 385/15; 385/123; 398/25; 398/27; 398/49

(58) Field of Classification Search .................. 385/14, 385/15, 16, 17, 18, 24, 25, 42, 45, 46, 49, 385/79, 83, 123, 124; 398/25, 27, 49, 79, 398/83, 30, 32, 33, 17; 346/33 R, 150.1, 346/107.1
See application file for complete search history.

(56) References Cited

U.S. PATENT DOCUMENTS

| | | | | |
|---|---|---|---|---|
| 5,978,113 A * | 11/1999 | Kight | ............................ | 398/1 |
| 6,088,497 A * | 7/2000 | Phillips et al. | ................. | 385/48 |
| 6,144,633 A * | 11/2000 | Ikeda et al. | .................. | 370/217 |
| 6,154,584 A * | 11/2000 | Lindgren et al. | ................ | 385/16 |
| 6,204,945 B1 * | 3/2001 | Iwata et al. | ..................... | 398/9 |
| 6,226,111 B1 * | 5/2001 | Chang et al. | .................... | 398/9 |
| 6,862,380 B2 * | 3/2005 | Chaudhuri et al. | ............ | 385/17 |
| 7,171,070 B1 * | 1/2007 | Birk et al. | ....................... | 385/24 |
| 7,228,027 B1 * | 6/2007 | Birk et al. | ....................... | 385/24 |
| 7,389,018 B1 * | 6/2008 | Birk et al. | ....................... | 385/24 |
| 2002/0176131 A1 * | 11/2002 | Walters et al. | .............. | 359/118 |
| 2002/0178417 A1 * | 11/2002 | Jacob et al. | .................. | 714/752 |
| 2003/0133651 A1 * | 7/2003 | Hakimi et al. | ................. | 385/27 |
| 2003/0223689 A1 * | 12/2003 | Koch et al. | ..................... | 385/37 |
| 2004/0179472 A1 * | 9/2004 | Khalilzadeh et al. | ......... | 370/227 |
| 2005/0111350 A1 * | 5/2005 | Kano | .......................... | 370/216 |

* cited by examiner

*Primary Examiner*—Brian M Healy

(57) ABSTRACT

An arrangement provides low cost path protection in an optical communications network. The arrangement has a portion 3 that provides (broadcasts) an outbound optical signal, and at least first and second transmitting portions 202, 206 transmit the outbound optical signal simultaneously onto at least first and second respective mutually distinct optical pathways 231, 232. Meanwhile, a selection arrangement 204 selects among plural incoming optical signals (via 1, 5) according to a SELECT control signal 228 to provide a selected signal, and an analyzer 222 analyzes characteristics of the selected signal to provide the SELECT control signal 228.

20 Claims, 6 Drawing Sheets

ARRANGEMENT FOR LOW COST PATH PROTECTION FOR OPTICAL COMMUNICATIONS NETWORKS

CROSS-REFERENCE TO RELATED APPLICATIONS

This is a continuation of U.S. application Ser. No. 11/799,007, filed Apr. 30, 2007, now U.S. Pat. No. 7,389,018, issued Jun. 17, 2008, which was a continuation of U.S. application Ser. No. 11/513,970, filed Aug. 31, 2006, now U.S. Pat. No. 7,228,027, issued Jun. 5, 2007, which was a continuation of U.S. application Ser. No. 11/051,377, filed Feb. 4, 2005, now U.S. Pat. No. 7,171,070, issued Jan. 30, 2007, each of which is incorporated herein by reference in its entirety. Priority to both applications is claimed.

BACKGROUND OF THE INVENTION

1. Field of the Invention

The invention relates to arrangements for path protection for optical communications networks. More specifically, the invention relates to arrangements for path protection that involve intelligent monitoring and selection from among plural incoming signals that may have taken at least partially geographically diverse paths to arrive at their destination, yet in a way that reduces hardware costs by avoiding a need for duplicative transponders or other optical elements.

2. Related Art

It is known in the art to provide "1+1" path protection to signals in optical communications networks. Briefly, "1+1" path protection involves embedding the same information in optical signals sent via geographically diverse pathways. In this arrangement, if one pathway is broken by malfunction, fiber cut or the like, then the information may be switched to reach its destination through the other pathway(s).

Alternative "1+1" schemes are shown in FIGS. 1A and 1B. A first site 141 is connected to a second site 142 via plural optical pathways such as first pathway 31 and second pathway 32. Sites 141 and 142, which may be hundreds or thousands of kilometers apart, may be considered to constitute nodes in an optical communications network. First and second pathways 31, 32 may each include amplifiers, intervening sites, and other elements that are not specifically shown. Pathways 31, 32 in "1+1" schemes may traverse geographically different paths so that any malfunction, fiber cut, or the like, along one pathway is less likely to affect the other pathway than if the pathways were not geographically diverse.

FIGS. 1A, 1B illustrate an internal architecture of site 141, with the understanding that site 142 may have an identical or similar architecture.

FIGS. 1A, 1B each illustrate a wavelength selective switch (WSS) 10 configured to route optical signals between and among three bidirectional optical pathways W, N, and E. (Of course, W, N, and E are arbitrary designations of the pathways, and the pathways are not required to extend in respective westward, northward, or eastward directions.)

Wavelengths incoming on optical pathway W from an optical amplifier A and passive coupler (or splitter) 1 are sent to N×1 switches 104 and 106 for the N and E pathways, respectively. Likewise, wavelengths incoming on optical pathway N from an optical amplifier C and a passive coupler (or splitter) 3 are sent to N×1 switches 102 and 106 for the W and E pathways, respectively. Similarly, wavelengths incoming on optical pathway E from an optical amplifier e and passive coupler (or splitter) 5 are sent to N×1 switches 102 and 104 for the W and N pathways, respectively.

For output from the WSS, the output of N×1 switch 102 is provided to output pathway W by driving an optical amplifier B. Likewise, the output of N×1 switch 104 is provided to output pathway N by driving an optical amplifier D. Similarly, the output of N×1 switch 106 is provided to output pathway E by driving an optical amplifier F.

The FIGS. 1A, 1B architecture reflects an approach to optical adding and dropping called "broadcast-and-select." In conventional broadcast-and-select, only one of switches 102, 106 transmits the outbound signal provided by coupler 3. The other switch of 102, 106 does not transmit the signal, so that the signal only goes out on one of pathways W or E, not on both pathways.

Site 141 also has a local add-drop terminal (ADT) 20 that communicates with WSS 10 via bidirectional optical pathway N. Terminal 20 is controlled by an element 30 that communicates with elements (not shown) in higher layers of a communications protocol stack. Element 30, which may be a router or protocol multiplexing device, also provides network layer control and data signals to the lower level (data link layer) WSS 10. In the present context, router 30 may be considered to constitute, or at least interface with, a client.

Within terminal 20 is a multiplex/demultiplex (MUX/DEMUX) element 24 that communicates on bidirectional pathway N with WSS 10. MUX/DEMUX element 24 also communicates with each of plural (for example, two) bi-directional transponders 26A, 26B (collectively called element 26). Each bidirectional transponder communicates with router 30.

Each bi-directional transponder includes, in series leading from MUX/DEMUX element 24: an optical-line element 26OL, an electronics element 26E, and an optical-tributary element 26OT, all of which may be of conventional design. The optical-tributary element is the client-facing portion of the transponders and constitutes the short-reach optics connecting the terminal to the client. Electronics element 26E performs the regeneration, re-amplification and re-timing function ("3R") and other transponder functionality. Finally, optical-line element 26OL is a tunable long-reach laser and receiver for generating the outbound interoffice signal, and for receiving such signals from other sites.

In FIG. 1A, it is the client that provides the 1+1 functionality. This functionality may be accomplished, for example, by providing a second laser and receiver on the line card of router 30, together with the electronics needed to monitor the health of the incoming signals and switch between them as needed. The entire line card might need to be duplicated. However, because much of the functionality of the backbone router is likely to be located on the line card, this arrangement raises significant cost problems.

In contrast to the FIG. 1A arrangement, FIG. 1B shows an approach in which there need only be a single laser/receiver on the line card of router 30. However, a separate "1+1" subsystem 32 is required, to split the outbound signal and receive the two incoming signals and switches between them as needed. Subsystem 32 performs quality analysis on incoming signals. Subsystem 32 could be in a discrete box separate from the client equipment 30 and integrated optical cross-connect (IOXC) terminal 20, or it could be physically within the IOXC terminal 20 with cabling to the two IOXC terminal transponders 26A, 26B.

Unfortunately, the arrangements in FIGS. 1A and 1B have significant shortcomings, especially in terms of cost. In particular, both arrangements require plural transponders, plus additional hardware either within router 20 (FIG. 1A) or as an additional subsystem 32 (FIG. 1B). Thus, there is a need in the art to provide increased communication reliability through path protection without incurring the increase costs of systems such as that shown in FIGS. 1A and 1B.

More generally, it is known to provide a "protection" path as an alternate to a "working" path. For example, U.S. Patent Application Publication No. 2004/0179472 (Khalilzadeh et al.) discloses an arrangement in which a traffic signal on a working path is monitored, and upon a drop node's detection of a failure in the traffic signal, the network forwards the traffic signal on a protection path. However, such arrangements do not inherently provide that traffic is simultaneously carried on the two paths, and the setting up the protection path traffic delays data transmission.

Other arrangements involve switching the same data between the working and protection paths. For example, U.S. Patent Application Publication No. 2002/0176131 (Walters et al.) discloses protection switching involving first and second optical cards connected to the working and protection paths, as well as an "inter card communication channel" that allows a one of the paths to be connected to an opposite optical card. Because of the requirement for a second card, this arrangement appears to have shortcomings similar to the arrangements in FIGS. 1A and 1B.

Still other arrangements involve distributed control of protection switching. For example, U.S. Pat. No. 6,144,633 (Ikeda et al.) discloses an arrangement in which each node in a network stores information concerning the connection status of all other nodes, so as to optimize line switching in the event of a failure. However, this arrangement is not only complex and costly in terms of required hardware and control structure, but fails to involve simultaneous transmission of the same signals that permits simple and reliable restoration of service in the event of one path's failure.

Thus, undesirably, arrangements like those in FIGS. 1A and 1B require a doubling of the terminal optics and their attendant high costs. Moreover, none of the documents discussed above provide path protection simply, or at low cost. Accordingly, there is a need in the art for practical, low cost path protection in optical communications networks.

SUMMARY

An arrangement provides low cost path protection in an optical communications network. The arrangement has a portion configured to provide (broadcast) an outbound optical signal, and at least first and second transmitting portions transmit the outbound optical signal simultaneously onto at least first and second respective mutually distinct optical pathways. A selection arrangement selects among plural incoming optical signals according to a SELECT control signal to provide a selected signal, and an analyzer analyzes characteristics of the selected signal to provide the SELECT control signal.

BRIEF DESCRIPTION OF THE DRAWINGS

A more complete appreciation of the described embodiments is better understood by reference to the following Detailed Description considered in connection with the accompanying drawings, in which like reference numerals refer to identical or corresponding parts throughout, and in which.

DETAILED DESCRIPTION

Figure 1A:
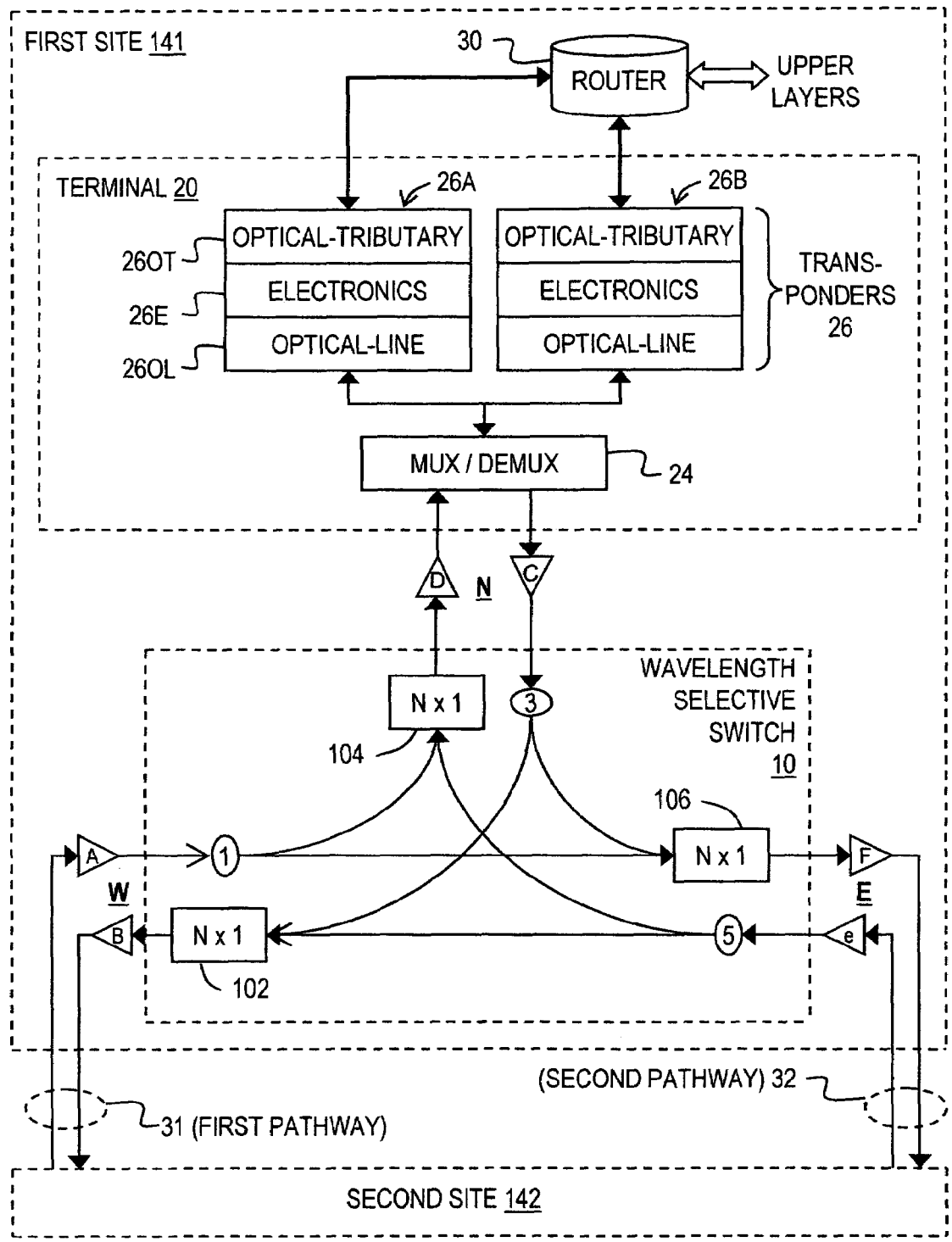
FIG. 1A is a schematic block diagram of a first conventional arrangement of "1+1" path protection, one that involves plural transponders 26A, 26B at a receiving site.

In describing embodiments illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. Various terms that are used in this specification are to be given their broadest reasonable interpretation when used to interpret the claims.

Moreover, features and procedures whose implementations are well known to those skilled in the art are omitted for brevity. For example, the selection, construction and/or use of elements employed in optical communications (such as repeaters, couplers, switches, wavelength blocking elements, terminals, and the like) are readily accomplished by those skilled in the art, and thus their details may be omitted. Also, common network communications techniques and network management techniques may be only briefly mentioned or illustrated, their details being well known by skilled artisans. Thus, the steps involved in methods described herein may be readily implemented by those skilled in the art without undue experimentation.

Figure 2A:
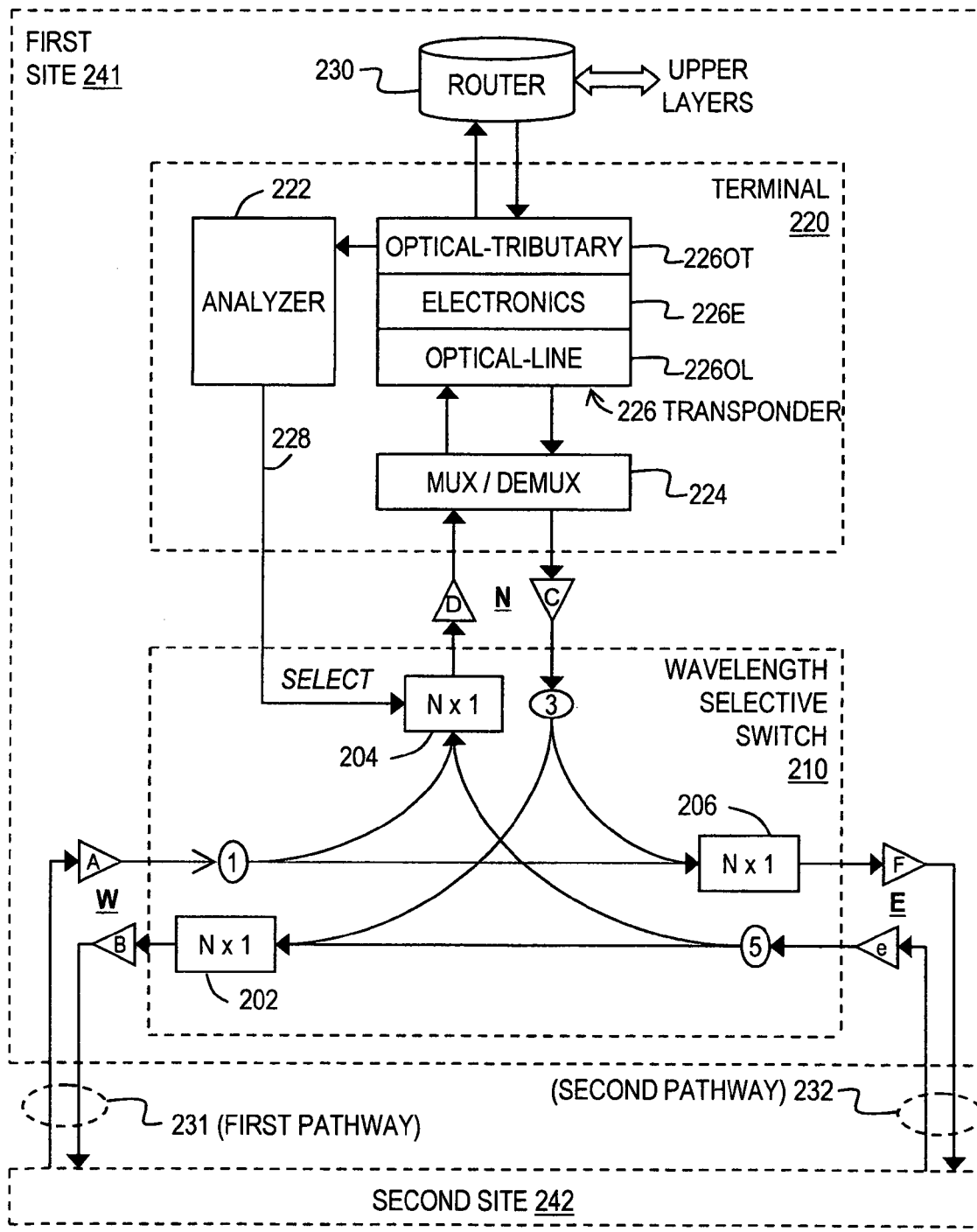
FIGS. 2A, 2B, 2C (collectively called "FIG. 2") are schematic block diagrams of embodiments of systems for path protection that involve only a single transponder 226, an analyzer 222 configured to intelligently monitor and select from among plural incoming signals, and that transmits an outbound optical signal simultaneously on two optical pathways (through 102 and 106)
Figure 2B:
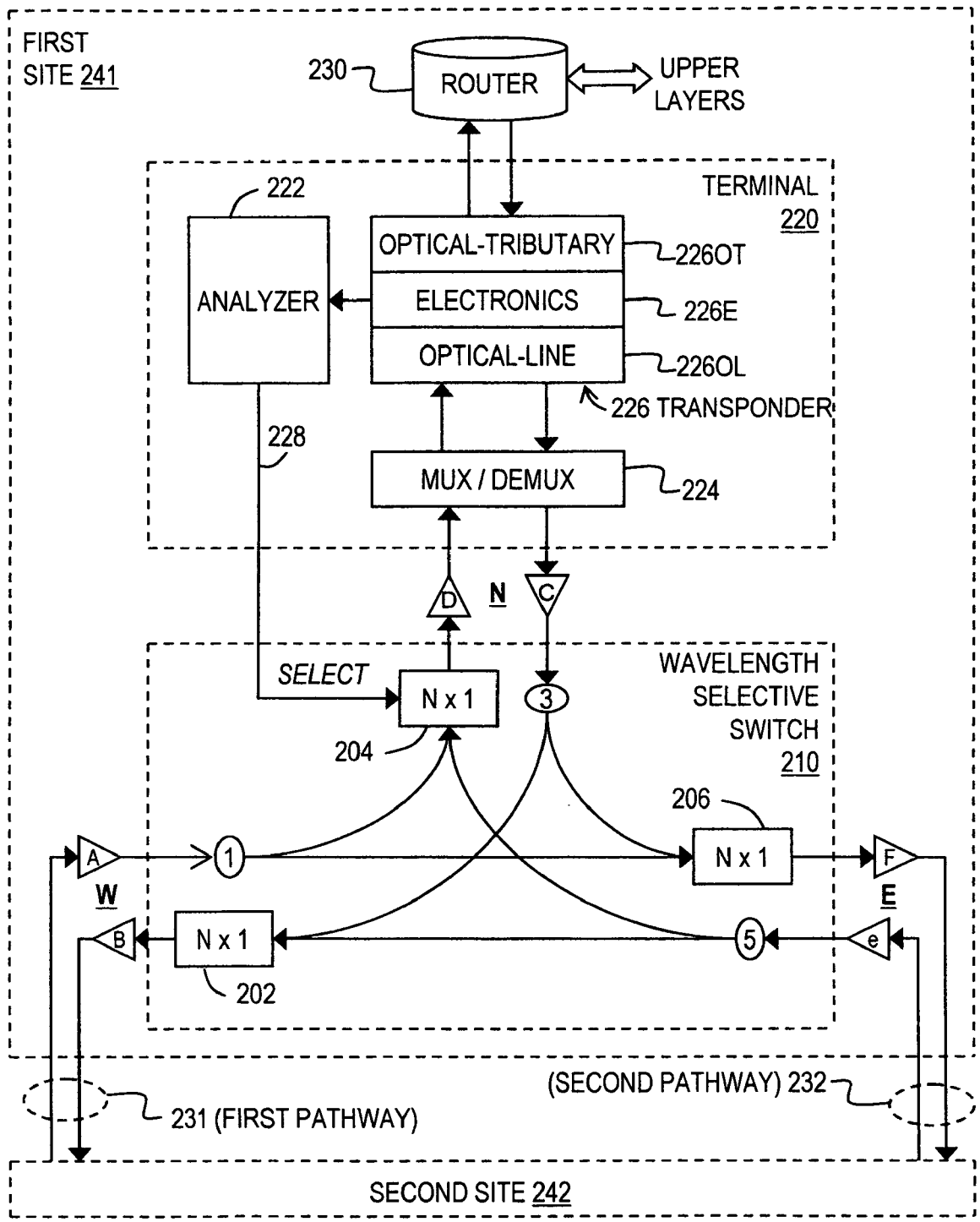
Figure 2C:
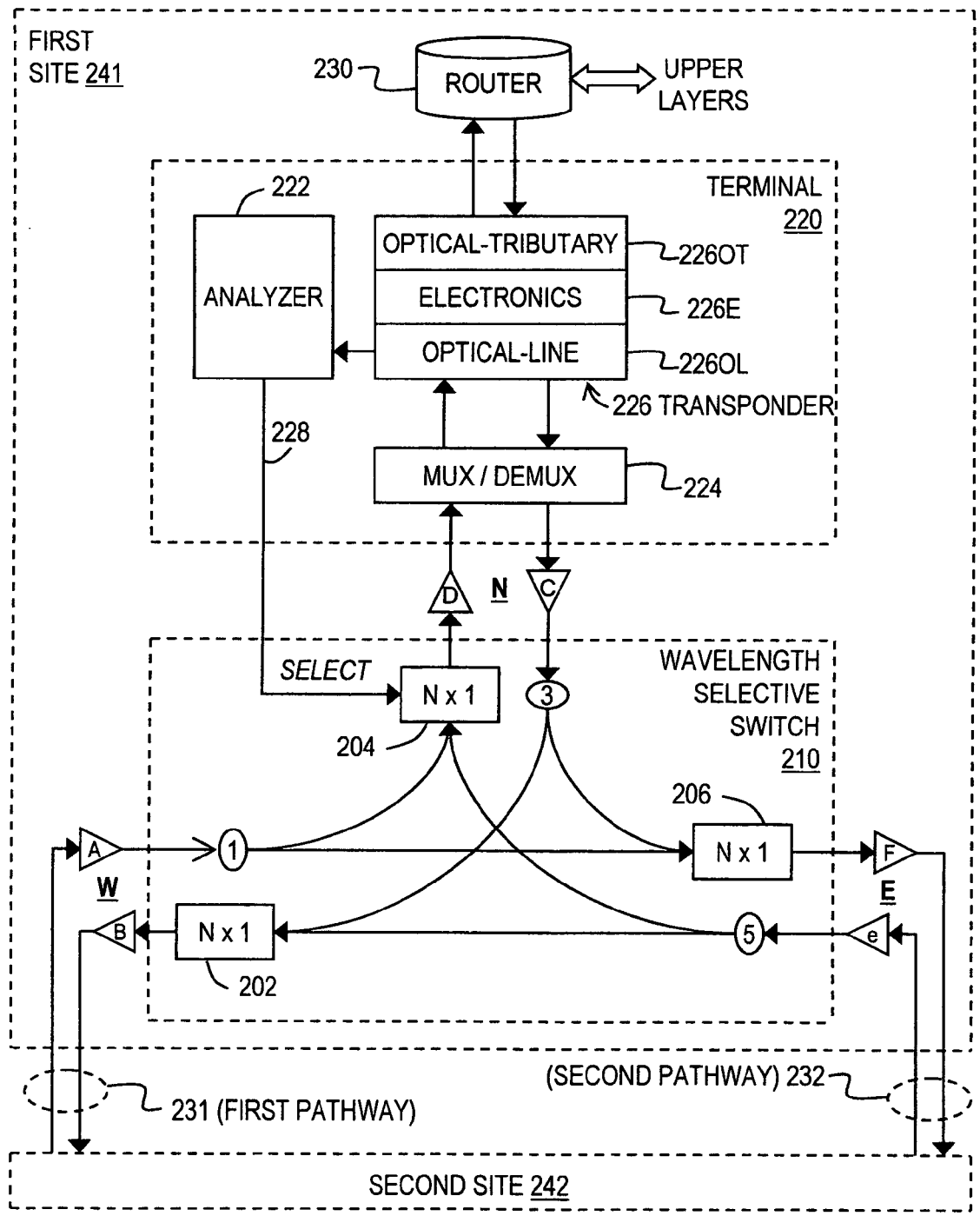

The inventors have realized that "broadcast-and-select" switching inherently creates duplicate signals and thus provides one key element of 1+1 protection switching for free. The broadcast feature can be utilized to send a copy of the signal to both primary ("working") and secondary ("protection") paths. It does not, however, inherently provide the tail-end signal monitoring and switching that is also needed. FIGS. 2A, 2B, 2C (collectively "FIG. 2") illustrate ways to provide a variant form of 1+1 protection that takes advantage of broadcast and select. The FIG. 2 architecture provides a dedicated "hot stand-by pathway" as does traditional 1+1 automatic protection switching (APS); however, the monitoring and switching is more sophisticated.

Figure 1B:
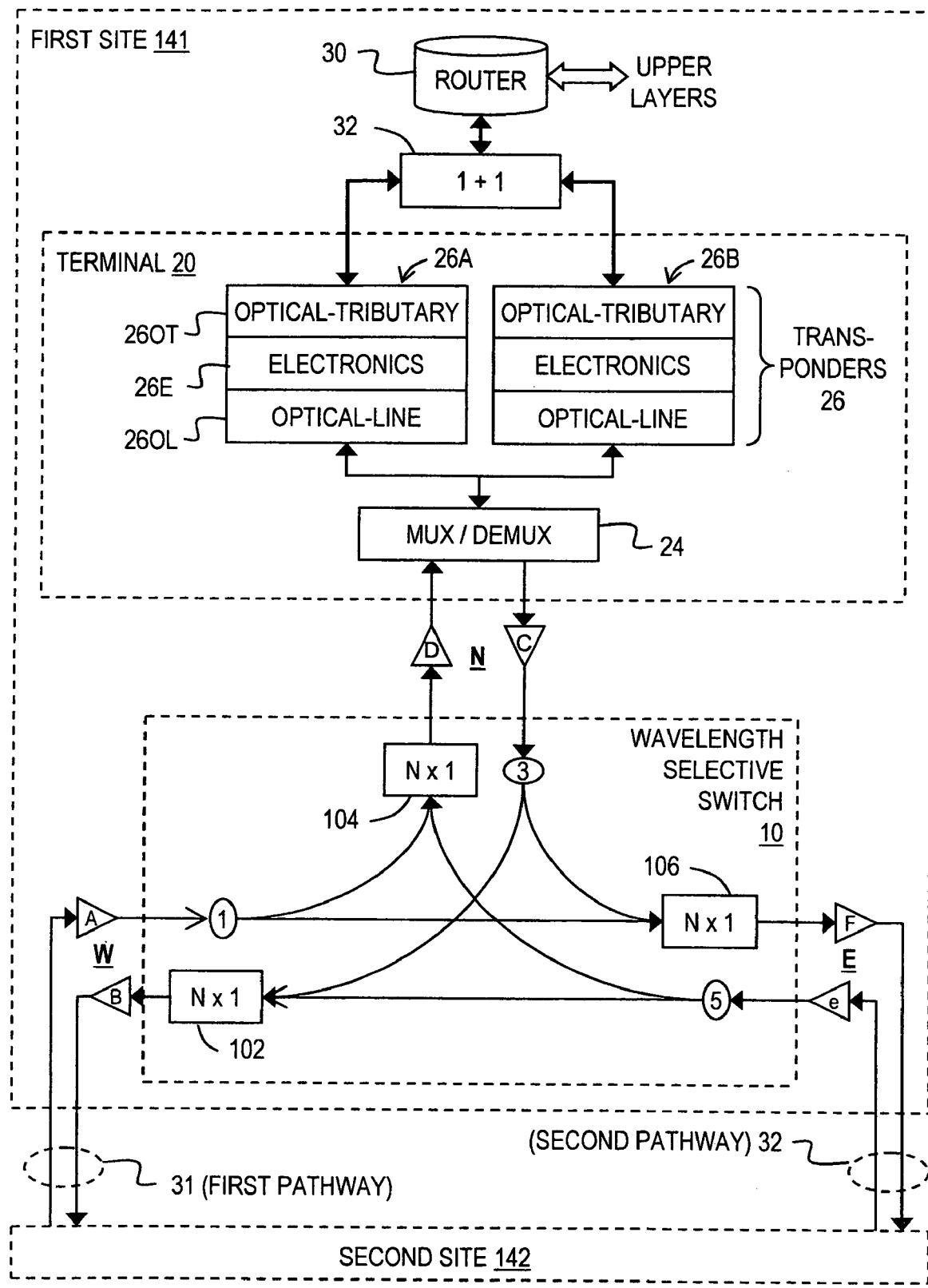
FIG. 1B is a schematic block diagram of a second conventional arrangement of "1+1" path protection, one that involves plural transponders 26A, 26B and a special "1+1" subsystem 32 at a receiving site.

Preliminarily, it is noted that the FIG. 2 embodiments include certain elements analogous to those described with reference to FIGS. 1A, 1B. For example, first and second sites 241, 242 (which may be similarly or identically structured and operated); first and second optical pathways 231, 232; optical amplifiers A, B, C, D, e, F; wavelength selective switch (WSS) 210 including elements 1, 3, 5, 202, 204, 206; and router 230 have analogs in FIGS. 1A, 1B (namely, first and second sites 141, 142; first and second optical pathways 31, 32; optical amplifiers A, B, C, D, e, F; wavelength selective switch (WSS) 10 including elements 1, 3, 5, 202, 204, 206; and router 30, respectively). Accordingly, a repetitive description thereof is omitted as being unnecessary, with at least the following distinctions being noted.

Significantly, the operation of WSS 210 differs from that of WSS 10 in that both switches 202, 206 transmit the outbound signal from coupler 3, whereas only one of switches 106, 206 transmit that outbound signal. Moreover, terminal 220 differs from transponder 20 in that terminal 220 does not require duplication of transponders or additional elements in router (client) 230, and no separate "1+1" element 32 is required.

It is recognized that there may be more pathways than pathways W and E extending from site 241. Showing only two redundant paths 231, 232 simplifies the drawings for purpose of illustration. In realistic scenarios, additional pathways may supplement pathways W and E. Thus, more than two incoming signals may reach switch 204; conversely, more than two signals may be provided by splitter 3 to more than two corresponding switches 202, 206, which simultaneously transmit the outbound signal on more than two redundant paths.

Moreover, the structure and operation of terminal 220 is substantially distinct from that of terminal 20. Terminal 220 includes a MUX/DEMUX element 224 that communicates with WSS 210 on bidirectional pathway N, and also with the terminal's transponder 226. Only one transponder 226 is needed in the illustrated embodiment, as compared with the two transponders 26A, 26B that are required in FIGS. 1A, 1B.

Transponder 226 includes an optical-line element 226OL, an electronics element 226E, and an optical-tributary element 226OT. Element 226OT communicates with an element 230, which may be a router or other element that communicates with upper layer elements (not specifically illustrated) and that provides network layer control and data signals to the lower level (data link layer) WSS 210. In the present context, router 230 may be considered to constitute or interface with a client.

Terminal 220 also includes an analyzer 222, which may derive its input from any of a variety of sources. For example, analyzer 222 may receive its input from optical-tributary element 226OT (as in FIG. 2A), from electronics element 226E (as in FIG. 2B), and/or from optical-line element 226OL (as in FIG. 2C). The interface between any element 226OT, 226E, or 226OL may be readily chosen or designed by those skilled in the art.

Regardless of its source, analyzer 222 determines the quality of the optical or electronic signal that is input to it. This determination may be made based on, for example, a bit error rate (BER) or other suitable measure of signal quality. Based on this signal quality determination, analyzer 222 provides a SELECT control signal 228 to switch 204 that determines which of the signals input to it are passed to terminal 220 (via optional amplifier D).

In embodiments based on FIG. 2, the two incoming paths use the same wavelength unless a regeneration takes place in the middle. It is recognized that the choice of wavelength, needed to support simultaneous availability of plural incoming signals to switch 204, places constraints on the availability of wavelengths around the network, especially if the alternate ("protection") path(s) are very long.

The operation of the FIG. 2 arrangements is now discussed in greater detail.

Plural (for example, two) copies of the outbound signal from terminal 220 are created by splitter 3. These plural signals drive switches 202, 206 in the WSS. So far, this operation is exactly what would happen with any outbound signal in FIGS. 1A, 1B. However, for 1+1 scenarios according to the embodiments of FIGS. 2A, 2B, 2C, both switches 202, 206 pass the wavelength onto the E and W pathways, respectively, to be routed over diverse paths W and E to second site 242.

Conversely, plural (for example, two) copies of incoming signals arrive from pathway W and from pathway E via splitters 1 and 5, respectively. Both incoming signals reach the input of switch 204, but only one signal is passed to terminal 220. The determination of which signal is passed and which signal is blocked is under control of SELECT control signal 228. Analyzer 222 in these embodiments thus tells switch 204 which signal to pass, based on (for example) the analyzer's determination of signal quality. This determination may be based on the relative quality of the two signals as based on bit error rate, or other criterion or criteria.

Analyzer 222 knows only the quality of the selected incoming signal; it does not know the quality of the other incoming signal that is being blocked (not selected) by switch 204. In an extreme scenario, if the current signal has an unambiguous failure due to loss of signal ("LOS"), loss of frame ("LOF"), and so forth, analyzer 222 instructs switch 204 to select the opposite incoming signal, even if the opposite signal's quality is uncertain. If the quality difference between the two incoming signals is less distinguishable, a more sophisticated analysis scheme is employed. For example, in scenarios of ambiguous relative signal quality, a method may be employed in which bit error rate (BER) is measured, and, when the BER is found to be excessive, the opposite signal is selected.

Other approaches to selecting an incoming signal include optical quality measures such as signal-to-noise ratio (SNR).

Analyzer 222 may be implemented as a general purpose or special purpose processor employing technology known by those skilled in the art to be appropriate to the functions performed. Appropriate software can readily be prepared by programmers based on the present teachings, using suitable programming languages operating with appropriate operating systems. Generally, such computers include at least one bus (including address, data, control) that connects various elements, including a processor for executing program instructions, memory for holding the program instructions and other data, disks and other storage devices for storing the program instructions and other information, computer readable media storing the program instructions, input and output devices, as well as various other elements such as ASICs, GALs, FPGAs, drivers, accelerators, DMA controllers, and the like. Such computer readable media constitute a computer program product including computer executable code or computer executable instructions that, when executed, causes the computer to perform the methods disclosed herein. Examples of computer readable media include hard disks, floppy disks, compact discs, DVDs, tape, magneto optical disks, PROMs (for example, EPROM, EEPROM, Flash EPROM), DRAM, SRAM, SDRAM, RDRAM, and the like.

Figure 3:
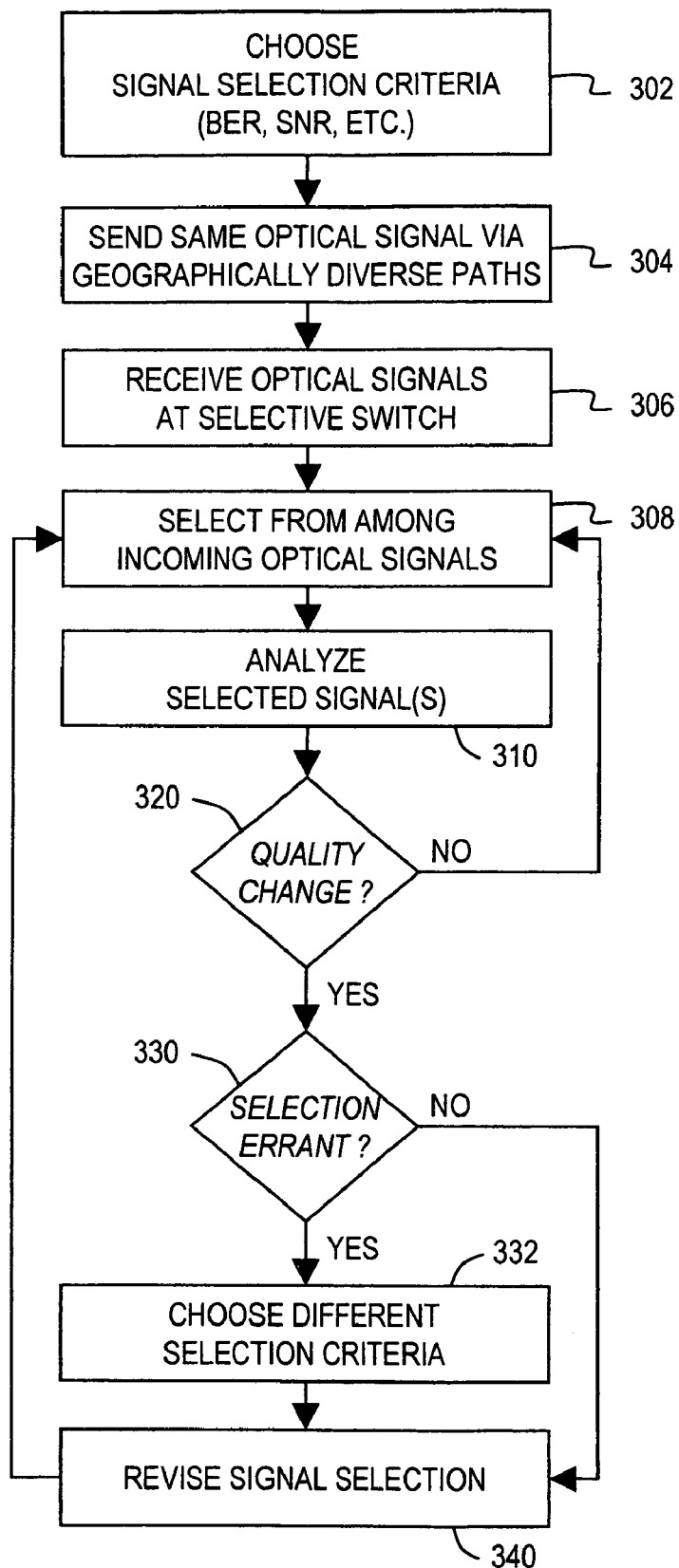
FIG. 3 is a flowchart of a method that may be carried out by, for example, the systems of FIGS. 2A-2C.

FIG. 3 is a flowchart of a method that may be carried out by, for example, the systems of FIGS. 2A-2C.

Block 302 indicates the choosing of a signal selection criterion or criteria. Conceptually, this step may be carried out during the network design stage and may be designed into operation of analyzer 222, but may be changed dynamically during operation (see block 332 below). For example, a selection criterion may be that the incoming signal on the first pathway 231 through splitter 1 is selected by switch 204 unless the BER of the selected signal exceeds a given threshold, at which time another signal (for example, the incoming signal on second pathway 232 through splitter 5) is selected to be passed through switch 204. The selection criterion or criteria are actually applied in step 308, discussed below.

Block 304 indicates the sending of plural signals, containing the same information, via at least partially geographically diverse pathways. Such pathways include pathways 231, 232, as well as any additional pathways that may be deemed suitable for adequate redundancy and path protection. In the present context, it is understood that in practice the two pathways may not be 100% geographically diverse, and that there may be some commonality of the two paths, even if this is in the "pipe" leading into the building. A goal is to maximize availability of communications between sender and receiver by selecting a second pathway if a primary pathway has a failure. For purposes of the present discussion, the sending may be thought of as occurring at, for example, second site 242.

Block 306 indicates the reception of the plural optical signals at the receiving site. This reception occurs, for example, at switch 204. The receiving may be thought of as occurring at, for example, first site 242.

Block 308 indicates the actual selection of one optical signal from among all the optical signals that are provided to switch 204. This selection is based on the SELECT control signal 228 provided by analyzer 222.

Block 310 indicates the ongoing analysis of the selected signal that may be performed by analyzer 222. The analysis may involve analysis of signal quality or some other criterion or criteria.

Decision block 320 generally indicates the determination of whether there has been a change in the nature or quality of the selected signal, under the selection criteria chosen in block 302.

If the signal quality has not changed to a degree that warrants changing which signal is selected, then control passes back to block 308 which represents a continued selection of the same incoming signal.

However, if the signal quality has changed to a degree that warrants changing which signal is selected, then control passes to block 330.

Block 330 indicates a decision as to whether the selection process itself is errant in some way. A selection process might be considered "errant" if, for example, it causes rapid and repeated switching between different incoming signals (chattering). Errant signal selection is an indication that the very selection criterion or criteria are not working well under current conditions.

In the event of errant signal selection, control passes to block 332, which indicates choosing of a different selection criterion or criteria before control passes to block 340. Choosing a different selection criterion might involve, for example, simply raising a BER threshold to avoid chatter, or purposely introducing a delay between successive changes in which signal is selected, and so forth.

If, however, block 330 determines that the signal selection process not to be errant (the predominant experience in an apparatus well tuned to current conditions), then control bypasses block 332 and proceeds directly to block 340.

Block 340 indicates a change in which signal is selected. This change is reflected in the value of the SELECT control signal 228, and occurs primarily as a result of the signal quality change detected in block 320. The change may also be affected by the change in selection criteria if block 332 is reached and executed. After block 340, control passes back to block 308, which represents selection of the (presumably) different incoming signal.

Blocks 330, 332 may be inserted into the FIG. 3 method at points other than between blocks 320 and 340. In any event, the method provides that not only can the basic signal selection decision be dynamically modified (blocks 320, 340), but the very criterion or criteria by which signals are selected may also be dynamically modified (blocks 330, 332). The decision making and other processing described with reference to 310-340 may be performed within analyzer 222, as it may be implemented in the form of a programmable processor or computer.

From the foregoing, it will be apparent to those skilled in the art that a variety of methods, systems, recording media bearing computer executable code or computer executable instructions, and the like, are provided.

The foregoing description provides support for an arrangement for low cost path protection in an optical communications network. The arrangement has a portion (3) configured to provide an outbound optical signal; at least first and second transmitting portions (202, 206) configured to transmit the outbound optical signal simultaneously onto at least first and second respective mutually distinct optical pathways (231, 232); a selection arrangement (204) configured to select among plural incoming optical signals (via 1, 5) according to a SELECT control signal (228), and to provide a selected signal; and an analyzer (222) configured to analyze characteristics of the selected signal and to provide the SELECT control signal (228).

The transmitting portions (202, 206) may be configured to simultaneously transmit the outbound optical signal onto the mutually distinct optical pathways (231, 232) that are at least partially mutually geographically diverse, so that failure of one of the mutually distinct optical pathways does not constitute a failure in another of the mutually distinct optical pathways.

The analyzer (222) may be configured to measure a bit error rate (BER) of the selected signal and to ensure that the SELECT control signal causes the selection arrangement to select an incoming optical signal that has less than a threshold BER value.

The analyzer (222) may be configured to measure a signal-to-noise ratio (SNR) of the selected signal and to ensure that the SELECT control signal causes the selection arrangement to select an incoming optical signal that has less than a threshold SNR value.

The arrangement may be located in a node of an optical communications network; and the node may include only a single transponder (226).

The transponder (226) may include an optical-line portion (226OT), an electronics portion (226E), and an optical tributary portion (226OL); and the analyzer (222) may be configured to provide the SELECT control signal based on an input received from one of the optical-line portion (226OT), the electronics portion (226E), and the optical tributary portion (226OL).

The transponder (226) may be configured to provide the selected signal to a device (230) that communicates information in the selected signal to higher layers of a communications protocol stack.

The present disclosure further provides support for an optical communications network having at least first and second nodes, each including a respective arrangement for low cost path protection, constructed and operating according to the arrangement described above; and the network also includes the at least first and second respective mutually distinct optical pathways, each extending between the first and second nodes and each carrying respective transmitted versions of the outbound optical signal from the first node to the second node, so that the transmitted versions of the outbound optical signal from the first node constitute the plural incoming optical signals at the second node.

The mutually distinct optical pathways may traverse at least partially geographically diverse paths in extending between the first and second nodes, so that a failure of one of the mutually distinct optical pathways does not constitute a failure in another of the mutually distinct optical pathways.

The present disclosure also provides support for a method (FIG. 3) of low cost path protection in an optical communications network. The method may involve, at a first node in the network, providing an outbound optical signal (via 3); at the first node, (304) transmitting plural versions of the outbound optical signal simultaneously onto respective mutually distinct and at least partially geographically diverse optical pathways (231, 232) that extend from the first node to a second node in the optical communications network, so that a failure of one of the optical pathways does not constitute a failure in another of the distinct optical pathways; at the second node, (308) selecting (204) among plural incoming optical signals (via 1, 5) constituting the plural versions of the outbound optical signal from the first node, according to a SELECT control signal (228), so as to provide a selected signal; (310) analyzing (222) characteristics of the selected signal; and (310) providing the SELECT control signal (228) based on analyzed characteristics of the selected signal.

The present disclosure further provides support for a method (FIG. 3) of low cost path protection in an optical communications network. The method may involve providing an outbound optical signal (via 3); (304) transmitting plural versions of the outbound optical signal simultaneously onto respective mutually distinct optical pathways (231, 232); (308) selecting (204) among plural incoming optical signals (via 1, 5) according to a SELECT control signal (228), so as to provide a selected signal; (310) analyzing (222) characteristics of the selected signal; and (310) providing the SELECT control signal (228) based on analyzed characteristics of the selected signal.

In (304) the transmitting step (202, 206) may include simultaneously transmitting the outbound optical signal onto the mutually distinct optical pathways (231, 232) that are at least partially mutually geographically diverse, so that failure of one of the mutually distinct optical pathways does not constitute a failure in another of the mutually distinct optical pathways.

In (310) the analyzing step (222) may include measuring a bit error rate (BER) of the selected signal; and ensuring selection of an incoming optical signal that has less than a threshold BER value.

The analyzing step (222) may include measuring a signal-to-noise (SNR) of the selected signal; and ensuring selection of an incoming optical signal that has less than a threshold SNR value.

The selecting (308) and analyzing (310) steps may be carried out in an optical communications network node that includes only a single transponder (226).

The transponder (226) may include an optical-line portion (226OT), an electronics portion (226E), and an optical tributary portion (226OL); and in (310) the analyzing step (222) may involve providing the SELECT control signal based on an input received from one of the optical-line portion, the electronics portion, and the optical tributary portion.

The method may further involve providing the selected signal to a device (230) that communicates information in the selected signal to higher layers of a communications protocol stack.

The present disclosure further provides support for a processing element configured to perform the analyzing and SELECT control signal providing steps described above.

The present disclosure also provides support for a recording medium including computer executable code or computer executable instructions that, when executed, cause the computer to perform the analyzing and SELECT control signal providing steps described above.

Many alternatives, modifications, and variations will be apparent to those skilled in the art in light of the above teachings. For example, the number and relative location and interconnection of elements may be varied while remaining within the scope of the present invention. Likewise, the steps involved in methods described herein may be implemented in a manner different than as described above. It is therefore to be understood that within the scope of the appended claims and their equivalents, the invention may be practiced otherwise than as specifically described herein.

What is claimed is:

1. An arrangement for low cost path protection in an optical communications network, the arrangement comprising:
a selection arrangement configured to select among plural incoming optical signals according to a select control signal, and to provide a selected signal;
an analyzer configured to analyze characteristics of the selected signal and to provide the select control signal according to a first signal selection criterion; and
an errant signal selection detector configured to determine whether a signal selection is errant, and, if so, to provide a second signal selection criterion to the analyzer.

2. The arrangement of claim 1, further comprising:
a portion configured to provide an outbound optical signal; and
at least first and second transmitting portions configured to transmit the outbound optical signal simultaneously onto at least first and second respective mutually distinct optical pathways.

3. The arrangement of claim 2, wherein:
the transmitting portions are configured to simultaneously transmit the outbound optical signal onto the mutually distinct optical pathways that are at least partially mutually geographically diverse, so that failure of one of the mutually distinct optical pathways does not constitute a failure in another of the mutually distinct optical pathways.

4. The arrangement of claim 1, wherein:
one of the first and second selection criteria is a signal-to-noise ratio of the selected signal.

5. The arrangement of claim 1, wherein:
one of the first and second selection criteria is a bit error rate of the selected signal.

6. The arrangement of claim 1, wherein:
the errant signal selection detector determines whether switching between different incoming signals exceeds a predetermined rate.

7. The arrangement of claim 1, wherein:
the first signal selection criterion is a first bit error rate and the second signal selection criterion is a second bit error rate.

8. The arrangement of claim 1, wherein:
the arrangement is located in a node of an optical communications network; and
the node includes only a single transponder.

9. The arrangement of claim 8, wherein:
the transponder includes an optical-line portion, an electronics portion, and an optical tributary portion; and
the analyzer is configured to provide the select control signal based on an input received from one of the optical-line portion, the electronics portion, and the optical tributary portion.

10. The arrangement of claim 8, wherein:
the transponder is configured to provide the selected signal to a device that communicates information in the selected signal to higher layers of a communications protocol stack.

11. A method of low cost path protection in an optical communications network, the method comprising:
- selecting among plural incoming optical signals according to a select control signal, so as to provide a selected signal;
- analyzing characteristics of the selected signal to determine a value for a first signal selection criterion;
- providing the select control signal based on the value of the first signal selection criterion;
- determining whether the signal selection process is errant; and
- if the signal selection process is errant, choosing a second signal selection criterion for use by the analyzer.

12. The method of claim 11, further comprising the steps of:
- providing an outbound optical signal; and
- transmitting plural versions of the outbound optical signal simultaneously onto respective mutually distinct optical pathways.

13. The method of claim 12, wherein:
the transmitting step includes simultaneously transmitting the outbound optical signal onto the mutually distinct optical pathways that are at least partially mutually geographically diverse, so that failure of one of the mutually distinct optical pathways does not constitute a failure in another of the mutually distinct optical pathways.

14. The method of claim 11, wherein:
one of the first and second selection criteria is a signal-to-noise ratio of the selected signal.

15. The method of claim 11, wherein:
one of the first and second selection criteria is a bit error rate of the selected signal.

16. The method of claim 11, wherein:
the first signal selection criterion is a first bit error rate and the second signal selection criterion is a second bit error rate.

17. The method of claim 11, wherein:
the step of determining whether the signal selection process is errant comprises determining whether switching between different incoming signals exceeds a predetermined rate.

18. The method of claim 11, wherein:
the selecting and analyzing steps are carried out in an optical communications network node that includes only a single transponder.

19. The method of claim 18, wherein:
the transponder includes an optical-line portion, an electronics portion, and an optical tributary portion; and
the analyzing step includes providing the select control signal based on an input received from one of the optical-line portion, the electronics portion, and the optical tributary portion.

20. The method of claim 18, further comprising:
providing the selected signal to a device that communicates information in the selected signal to higher layers of a communications protocol stack.

* * * * *